Jan. 3, 1961 J. J. ROCK 2,967,268
SERVOSYSTEM WITH ERROR SIGNAL PRODUCING MOTOR SPEED CONTROL
Filed Feb. 2, 1953 3 Sheets-Sheet 1
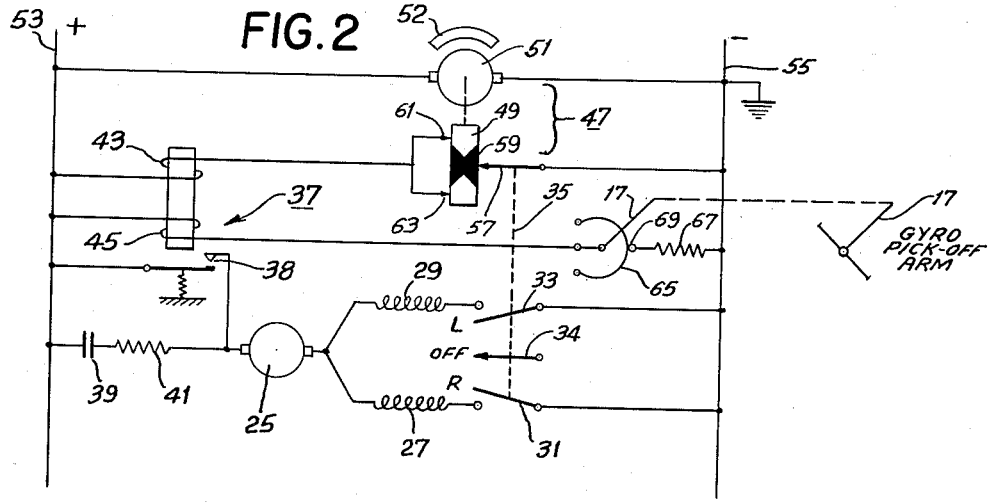
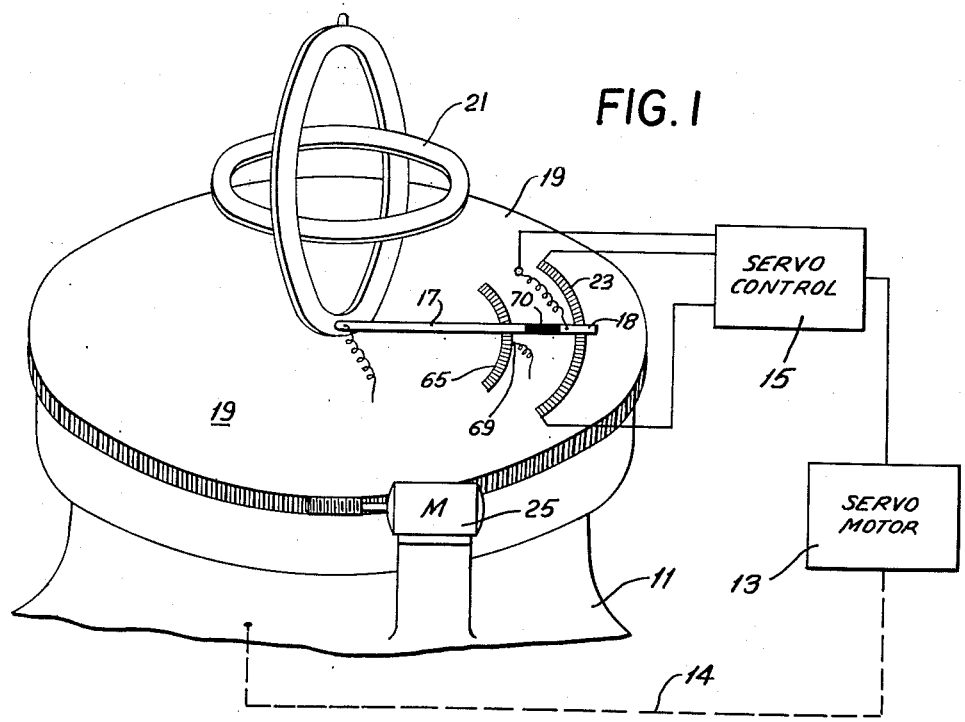
INVENTOR.
J. J. ROCK
BY
Robert S. Dunham
ATTORNEY Jan. 3, 1961 J. J. ROCK 2,967,268
SERVOSYSTEM WITH ERROR SIGNAL PRODUCING MOTOR SPEED CONTROL
Filed Feb. 2, 1953 3 Sheets-Sheet 2
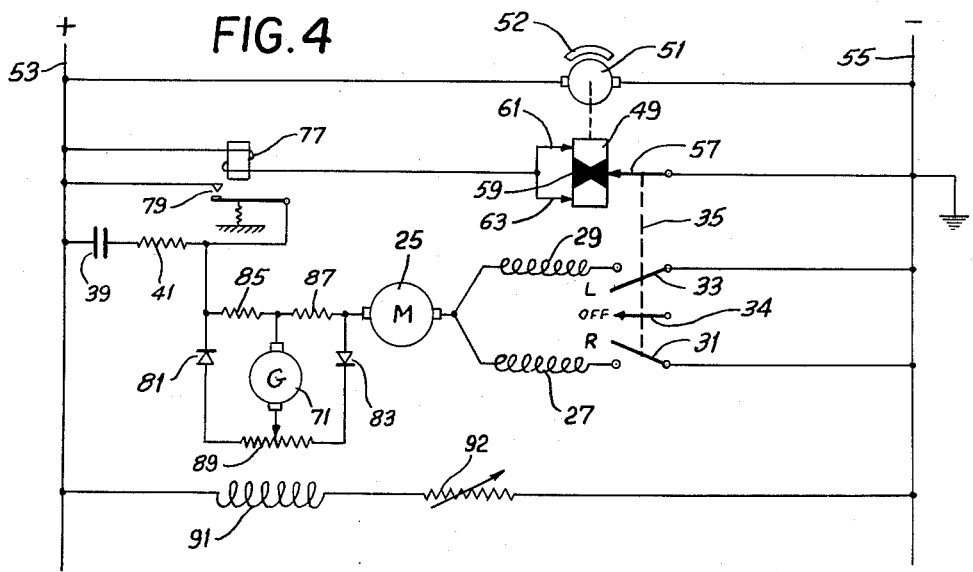
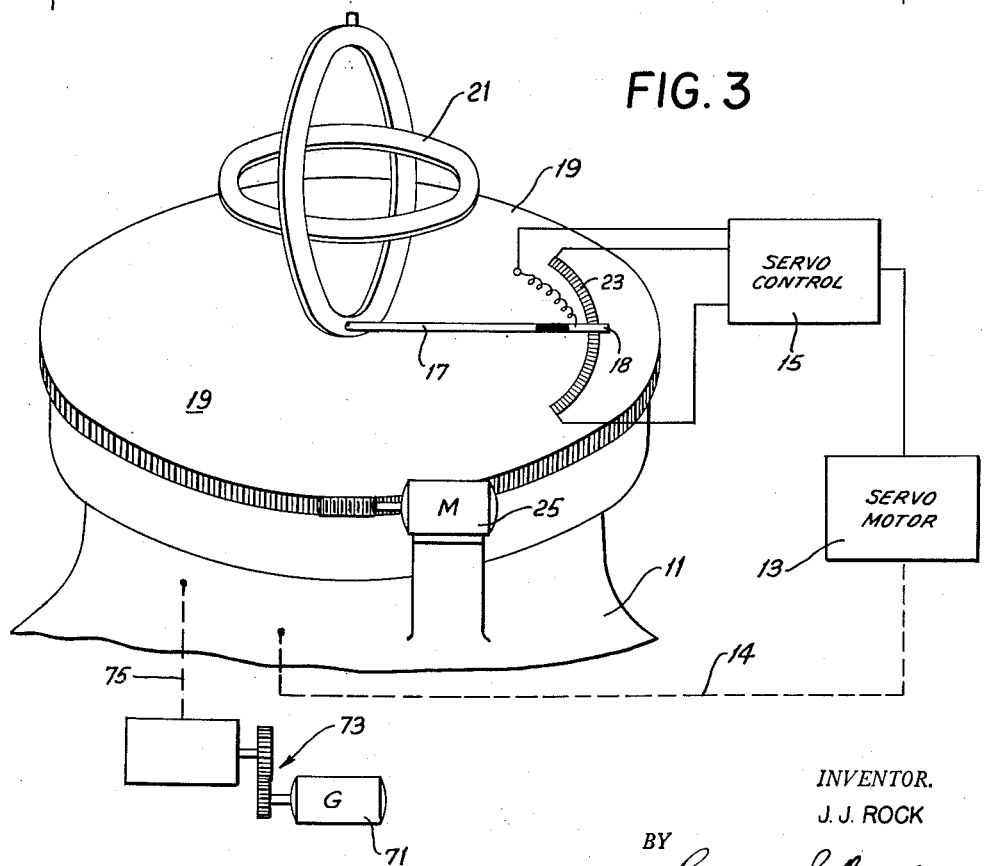
INVENTOR.
J. J. ROCK
BY
Robert S. Dunham
ATTORNEY

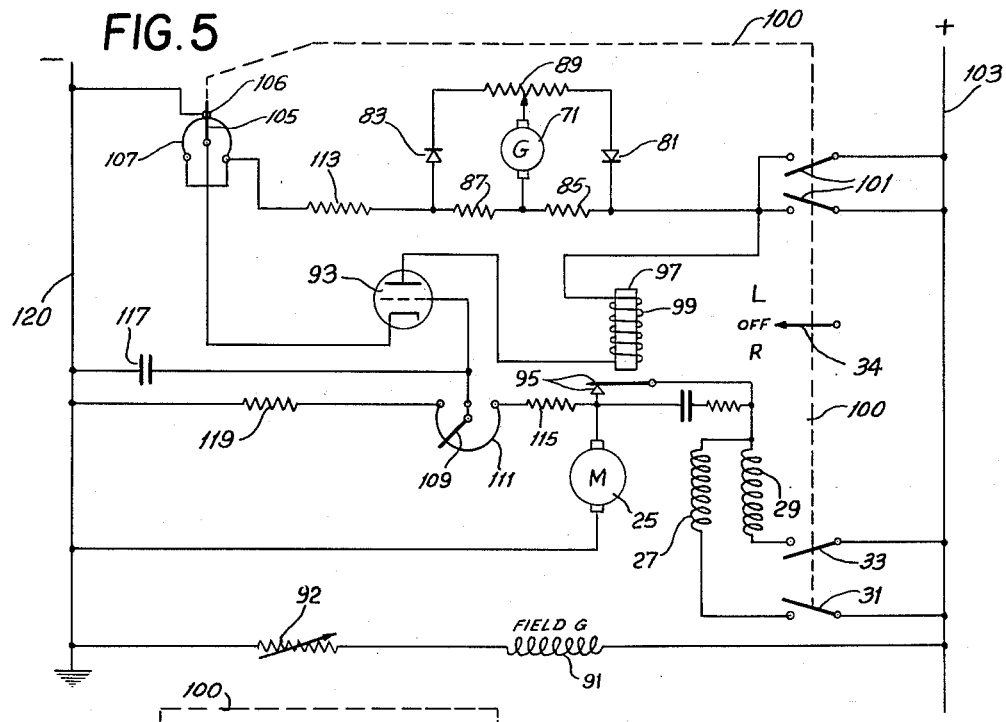

United States Patent Office 2,967,268
Patented Jan. 3, 1961

2,967,268

SERVOSYSTEM WITH ERROR SIGNAL PRO-
DUCING MOTOR SPEED CONTROL

Joseph J. Rock, Vestal, N.Y., assignor to International Business Machines Corporation, New York, N.Y., a corporation of New York Filed Feb. 2, 1953, Ser. No. 334,391

18 Claims. (Cl. 318—32)

In most servo systems which are being used to stabilize a heavy body as well as to provide a manual positioning control for the same body, the manual control is introduced by means of artificially producing an error signal in the system, to cause the servo motor to reposition the body as though it were maintaining the body in its stabilized position. In other words, such systems contain a stable reference device, such as a gyroscope, and contain pick-off means controlled by the stable device. The pick-off means introduces an error signal in the servo system whenever the heavy body changes its position with reference to the stable reference device. This error signal causes the servo motor to be energized and drive the heavy body back to the position about which it is being held stable. In order to introduce manual control into such a system, the pick-off means may be manually repositioned in any convenient way. The error signal thus manually introduced into the servo system will cause the heavy body to be driven to a new position, which may be wherever desired.

One way of introducing such manual control is to have an electric motor which is reversible and which is mechanically connected to the pick-off means. This motor may then cause a repositioning of the pick-off means thus introducing an artificial error signal to cause manually controlled repositioning of the heavy body. In a hydraulic servo system, when an electric motor is used for such positioning of a pick-off, difficulty may be encountered in that this motor will have a different rate of acceleration than the hydraulic servo driving motor. Because of this difference, the error signal will initially become much larger in magnitude than that required at a given selected velocity of the electric motor, and therefore the velocity of the hydraulic servo driving motor will overshoot that required. Such overshooting will produce a strong tendency to hunt in the velocity of the hydraulic servo driving motor. In order to overcome such difficulty, the systems of the present invention may be used.

Accordingly, it is an object of the present invention to incorporate in a hydraulic servo system electric tracking-motor control, which has means for regulating the speed of the tracking-motor dependent upon conditions in the hydraulic system.

Another object is to regulate the speed of an electric tracking-motor in a hydraulic servo system in an inverse manner as the speed of the positioning of the heavy body which is being positioned by the servo motor.

A further object is to provide improved electric motor control systems having incorporated therein auxiliary speed control dependent upon the response of an outside factor.

Another object of the present invention is to provide an electric motor control system for use with a servo system, the electric motor control system having speed control of the motor and an auxiliary control for changing the sensitivity of the speed control inversely in accordance with the amount of error signal being introduced into the servo system.

Another object of this invention is to provide a novel electric motor speed control system which involves speed control of an electric motor and a superimposed speed control to limit the speed of the motor in accordance with a separate control element.

For a more complete description of the invention, reference is made to the drawings, wherein:

Fig. 1 is a schematic diagram in perspective showing the location of the various elements of a hydraulic servo system in which the motor control systems of this invention are used;

Fig. 2 is a circuit diagram of one embodiment of a tracking-motor control circuit of this invention;

Fig. 3 is a schematic diagram of a hydraulic servo system employing a modification of this invention; and Figs. 4, 5 and 6 are circuit diagrams of various other modifications of tracking-motor control circuits of this invention.

As outlined above, a hydraulic stabilization and control system for a heavy body, such as a gun, for instance, may employ an electric motor for tracking purposes. In order to maintain a correspondence in speed between the tracking-motor and the heavy body that is being repositioned, an auxiliary speed control element in accordance with this invention may be used. Two systems for accomplishing such results are illustrated in Figs. 1 and 3. In Fig. 1 the auxiliary speed control element is incorporated with the gyroscope controlled pick-off elements, while in Fig. 3, the auxiliary speed control element consists of a tachometer generator which is directly driven by the heavy body. With these systems the speed of the tracking-motor will be directly effected by conditions in the servo system in such a way as to produce smooth anti-hunt control of the heavy body in tracking as will appear more fully below.

Some specific embodiments of the motor control circuits of this invention will be described with reference to Figures 2, 4, 5 and 6 of the drawings.

Fig. 1 illustrates by schematic diagram a servo system in which a tracking-motor control system of this invention is used. The servo system comprises a heavy body 11, only a fragment of which is shown. The heavy body is being maintained in a stabilized position by means of a servo motor 13, which is shown schematically by a box labeled "servo motor." The mechanical connection between servo motor 13 and the heavy body 11 is schematically illustrated by a dashed line 14. The servo motor 13 is controlled by a servo control circuit 15, illustrated schematically by a box. The error signal input which actuates the servo controls may be any conventional type, and is here illustrated as an electrical bridge type. The error signal is created by relative movement of a pick-off arm 17 and a turntable 19, upon which the framework of a gyroscope 21 is mounted. The gyroscope 21 is schematically illustrated as merely a pair of gimbal rings. Pick-off arm 17 is maintained in a stable position by means of the stabilizing effect of the gyroscope 21, since pick-off arm 17 is securely attached to the outer gimbal in a rigid manner. The base (not shown) of the gyroscope 21 is mounted on turntable 19.

The system is so arranged that there is no error signal when pick-off arm 17 is in its neutral or mid-position with respect to a resistance member 23 over which a tip 18 of pick-off arm 17 slides. Error signals are created whenever there is a displacement of pick-off arm 17 and its tip 18 from the neutral position on resistance member 23. Such error signals may be caused either by displacement of the heavy body 11 from its stabilized position (which carries turntable 19 and pick-off member 23 with it) or by means of an artificial displacement of the turntable 19 by means of an electric motor 25. In other words, the servo motor tends to maintain heavy body 11 stabilized about one axis for a given position with respect to space as determined by the stable line of reference set up by gyroscope 21. If it is desired to manually reposition or track the heavy body 11, the motor 25 is energized for one direction of rotation or the other to cause turntable 19 to be rotated as desired. Resistance member 23 will, of course, be moved with the turntable 19 and this will cause an error signal to be introduced into the servo control circuit 15 which in turn will cause the servo motor 13 to reposition the heavy body 11 to a new position, about which it will again become stabilized when the turntable 19 is no longer being rotated.

A motor control system for electric tracking-motor 25 is shown in Fig. 2. Electric motor 25 is a reversible motor having separate fields, 27, for one direction of rotation and 29, for the other direction of rotation. These fields 27 and 29 may be selectively put into the circuit by means of a pair of switches 31 and 33 respectively. These switches may be actuated by means of a conventional mechanism (not shown) which closes switch 31 when a central arm 34 is moved from the "off" position shown to the position marked "R" in Fig. 2, for one direction of rotation. The central arm 34 closes switch 33 when it is moved to the position marked "L" for the other direction of rotation. As is clear from the schematic showing in Fig. 2, the mechanism acts to alternatively select one or the other of fields 27 or 29 to cause the motor 25 to rotate in one direction or the other. This mechanism forms no part of the present invention per se and is merely illustrated by a dashed line 35. The direction selecting mechanism 35 has correlated with it a speed control unit which includes a pulse-producing device 47, the details of which will be explained below.

The speed of rotation of motor 25 is determined by means of an "on-off" or "make-and-break" control which is effected by means of a relay 37 having a pair of contacts 38. The contacts 38 are spring-biased to the open position as shown. There is a condenser 39 and a resistor 41 connected in series across the contacts 38 of relay 37. This resistor and condenser are for the purpose of reducing sparking and burning of the contacts of the relay. There are two windings upon relay 37. An upper winding 43, as viewed in the circuit diagram, is the control winding for the relay. A lower winding 45 is the bias winding which determines the amount of time delay between energization of control winding 43 and the actuation of the contacts 38 of the relay.

The speed of the motor 25 is determined by the duration of closing of the contacts 38 of relay 37, which contacts 38 may be closed for periods varying from zero to continuously closed. Such duration of closing is in turn determined by means of the pulse-producing device 47. This pulse-producing device may be any convenient apparatus which will accomplish the desired results. The type illustrated is that of a rotating commutator drum 49 which is driven by a motor 51 having a permanent magnet field 52, which motor 51 is shown continuously energized by connection from line wire 53 to line wire 55 as illustrated. Energization pulses for relay 37 are produced by commutator drum 49 whenever a sliding contactor 57 is moved to one side or the other from its central position illustrated. It will be observed that commutator drum 49 has an insulating material center section 59 which is generally of an hourglass-like configuration. Contact brushes 61 and 63 make contact with the end surface sections of commutator drum 49 which are composed of conducting material. By means of the shape of center insulating section 59, pulses of variable duration are produced when the sliding conductor 57 is moved away from its neutral position either up or down. Short pulses with long time duration spacing between them are produced first, with a small displacement of sliding contactor 57, and then progressively longer pulses with shorter spacing between them are produced as the sliding contactor is moved farther from its central position shown. The duration of these pulses determines the speed of motor 25 by determining the amount of energy supplied to the motor to cause it to rotate.

A superimposed speed or sensitivity control is provided by means of lower winding 45 of relay 37, which winding 45 is in circuit with a potentiometer type slide resistor 65 and a fixed resistor 67 connected in series therewith. The purpose of resistor 67 is to limit current flow through winding 45 of the relay 37 when the slider of slide resistor 65 is at the center position. The slide resistor 65 has a center tap connection 69.

It will be noted that slider of slide resistor 65 is marked 17 in Fig. 2. This is because, in the specific use of the motor control system shown in Fig. 1, the slider is composed of part of the pick-off arm 17, there being an insulating section 70 which separates the tip 18 of the arm 17 electrically from the remainder thereof. It will be clear to one skilled in the art that a linkage could be used to replace the common arm shown in Fig. 1, so that the slider of slide resistor 65 would be actuated by the relative motion of the pick-off arm of a gyro or other type of reference device with respect to its base. The physical position of the resistor 65 which is mounted on the turntable 19 as shown in Fig. 1, is made such that when pick-off arm 17 is in its neutral or no-signal position; the slider of slide resistor 65, which slider is part of pick-off arm 17 itself, will be at the center of resistor 65 or over the center tap connection 69.

The result of using slide resistor 65 in series with the bias winding 45 of the relay 37 is to control the amount of current flow in the bias winding from a maximum, when the slider is over the center tap 69, down to a minimum when the slider is displaced its full amount in either direction. This means that as the error signals of the servo system increase from zero, the amount of current flow in winding 45 will decrease correspondingly. The effect of this decrease of current flow will be to reduce the magnetic saturation in the core of relay 37 and hence increase the time lag necessary for closing the contacts of relay 37 when control winding 43 is energized. Therefore, when a pulse that energizes winding 43 has a given duration, as determined by the position of slide arm 57; it will close the contacts 38 of the relay 37 for a time duration depending upon the time delay after the beginning of each pulse before the contacts 38 are closed. In other words, if sliding contactor 57 is manually moved up or down as viewed in the circuit of Fig. 2 (by moving arm 34 as previously explained), pulses will be produced to effectuate closing of the contacts 38 of relay 37. The duration of these pulses will determine the duration of closing of the contacts 38 for a given setting of slide resistor 65. But, by varying the amount of current in bias winding 45 by means of the setting of slide resistor 65; the time lag between the beginning of a pulse which energizes control winding 43 and the closing of contacts 38, may be varied, and hence the speed of rotation of the motor 25 will likewise be varied.

Since the inertia of turntable 19, which is being rotated by motor 25, is low compared to the inertia of the heavy body 11 which the servo motor drives, it is desirable to modify the speed of rotation of motor 25 with relation to the amount of error signal being introduced into the servo motor control system. Such modification of the speed of motor 25 is produced by the variable resistor 65, the slider of which is actuated by the pick-off arm 17 as has just been explained.

Fig. 3 illustrates another embodiment of a servo system of this invention employing a device depending upon the speed of positioning of the heavy body to introduce a speed control factor for the tracking motor. The servo system is schematically shown and has the same elements of the system illustrated in Fig. 1 with minor changes. For this reason, the same reference numbers will be used for the corresponding elements of the servo system illustrated in Fig. 3 as those shown in Fig. 1. Heavy body 11, only a fragment of which is shown, is mechanically positioned by means of the hydraulic servo motor 13 (which is schematically illustrated by a box) and by suitable mechanical connection between the heavy body 11 and servo motor 13, such as is schematically illustrated by dashed line 14. The servo motor 13 is controlled by a suitable control circuit 15 which is also schematically illustrated by a box. Servo control circuit 15 is in turn controlled by the elements of a pick-off, which may be any appropriate type of mechanism depending upon the type of control circuit and servo motor being used.

I have shown for purposes of illustration a bridge type electrical pick-off device which consists of a pick-off arm 17 having a tip member 18 insulated from the main portion of the arm 17. Arm 17 is securely fastened to the outer gimbal of a gyroscope 21 which is schematically illustrated by a pair of gimbals. The gyroscope 21 is carried by its own base (not shown) which in turn is mounted on a turntable 19. As was explained with reference to Fig. 1, error signals are introduced into the servo control circuit 15 by means of the tip member 18 of gyroscope arm 17 which tip 18 makes sliding contact with a potentiometer resistance member 23. The extremities of resistance member 23 are connected to the servo control circuit 15 as shown. This control circuit is such that when tip member 18 is at a neutral position or circuit balance relationship, no error signal exists, but if the arm 17 is moved relative to turntable 19 (on which resistance member 23 is mounted), tip member 18 will consequently be carried to a new position away from neutral and, hence, an error signal will appear in the servo control circuit 15 which will cause servo motor 13 to drive the heavy body 11 into a new position. Turntable 19, which is carried by heavy body 11, is therefore repositioned also; but it will be positioned in such a way as to reduce the error signal toward zero by moving the turntable 19 and the resistance member 23 which is mounted thereon relative to tip member 18 so that tip member 18 will be returned to the neutral, no signal, position.

In the servo system as illustrated by Fig. 3, there is a tachometer generator 71, which is driven by reduction gearing 73 which, in turn, is directly connected to heavy body 11, by some mechanical means schematically illustrated by dashed line 75. It is to be noted that generator 71 and its reduction gearing 73 are attached to the mounting (not illustrated) which carries heavy body 11 for positioning the body 11 relative to its mounting. The same thing is true also of servo motor 13 which repositions heavy body 11 with respect to its mounting (not shown), i.e. servo motor 13 is also mounted upon the mounting for heavy body 11.

It will be observed that the tracking-motor 25, which operates to introduce an artificial error signal in the manner as was previously explained with reference to Fig. 1, is driven by a circuit which has at least two elements of speed control included therein. One of these elements of speed control is tachometer 71, in the servo system illustrated by Fig. 3. A corresponding element of speed control in the servo system illustrated by Fig. 1 is slide resistor 65 and gyro arm 17 taken together. In either of the servo systems illustrated, there is an element of speed control for the tracking motor 25, which element is actuated by the servo system and therefore serves to govern the speed of the tracking motor 25 in relation to the performance of the servo system and hence to prevent overshooting of the pick-off elements and consequent hunting effects. The other element of speed control for the tracking-motor 25 is in each case the primary speed control element of the circuit which is manually actuated and is the means for determining tracking speed within the limits of the servo system. For example, the speed of tracking-motor 25 is primarily determined by sliding contactor 57 in the Fig. 2 circuit, or by the same sliding contactor 57 in the Fig. 4 circuit, or by a slide arm 105 in the Fig. 5 circuit, or finally by a slide arm 76 in the Fig. 6 circuit. At the same time, this same tracking motor 25 has, in each case, the speed at which it will run controlled by an element actuated by the servo system which is arm 17 of slide resistor 65 in Figs. 1 and 2, or is tachometer generator 71 in Figs. 3, 4, 5 and 6.

In the system illustrated by Fig. 3, tachometer generator 71 is degeneratively coupled into the motor circuit so that an inverse speed control of motor 25 with relation to the speed of positioning of heavy body 11 may be had. In other words, while the heavy body 11 is being positioned by servo motor 13, tachometer generator 71 will be driven, and since the generator 71 is degeneratively coupled into the circuit of motor 25, the greater the speed of positioning of heavy body 11, the greater will be the reduction in speed of the motor 25. Good anti-hunt tracking control will therefore be had since the tracking motor 25 will not be allowed to drive turntable 19 too fast for the repositioning of heavy body 11 by servo motor 13.

The motor control circuit for tracking-motor 25 may take numerous forms, among which are the systems of this invention illustrated by Figs. 4, 5, and 6. Fig. 4 is similar to Fig. 2 and many of its elements are the same as the corresponding elements of Fig. 2. Motor 25 has two fields 27 and 29 which are alternatively connected to produce reversible operation of the motor 25. As in Fig. 2, there is a pair of switches 31 and 33 which are alternatively closed by means of a central arm 34 which also has a mechanical connection illustrated by dashed line 35 to a sliding contactor 57. Sliding contactor 57 cooperates with a revolving drum 49, which, in turn, is continuously rotated by a motor 51 which has a permanent magnet field 52 and which (motor 51) is directly connected across the source of electric current. The drum 49 has an insulation section 59 which is shaped generally in an hourglass configuration so that, when sliding contactor 57 is in its central position as illustrated, no circuit is being completed for a relay winding 77 which is directly connected to positive line wire 53 and to upper and lower contact brushes 61 and 63 respectively. Contacts 79 of relay 77 are in series with the armature of motor 25 so that the amount of energy which is supplied to motor 25 for driving the same, is determined by the duration of time when the contacts 79 are closed. It will be noted that relay winding 77 will be periodically energized when sliding contactor 57 is moved away from the central position so that varying periods of circuit completion for relay winding 77 are accomplished by commutator drum 49, depending upon how far away from the central position sliding contactor 57 is moved. It will be evident that the duration of periods of energization of relay winding 77 by the commutator drum 49 may be varied from a very short time (twice each revolution) up to a continuous energization of the winding 77. Contacts 79 themselves set up a make and break speed control for motor 25 which is directly controlled by the winding 77 of the relay so that the motor speed is varied from slow to full speed as contacts 79 are closed for very short periods (producing slow speeds), through the continuous closing of contacts 79 (which produces full speed). The auxilary speed control factor which is introduced by tachometer 71 is incorporated in the circuit for motor 25 by means of the illustrated generator network circuit. There is a pair of rectifiers 81 and 83 in circuit with the generator 71 as shown. There are also resistors 85 and 87 which are in series with the armature of motor 25 and with contacts 79 of speed control relay 77. Generator 71 is connected from the midpoint between resistors 85 and 87 to the electrical midpoint of a potentiometer type resistor 89. The purpose of the circuit elements just enumerated in connection with generator 71, is to obtain a degenerative effect from the output of generator 71 with respect to the speed of motor 25, irrespective of the direction of turning of the generator 71.

There is a field winding 91 for generator 71 which has a variable resistor 92 in series therewith. The purpose of variable resistor 92 is merely to regulate the strength of the field of generator 71 as desired.

As in the circuit of Fig. 2, there is a condenser 39 in series with a resistor 41 which, together, are connected across the contacts 79 of relay 77 in order to reduce the sparking and burning of the contacts.

It will be observed that by properly polarizing the rectifiers 81 and 83, the impedance of one of the parallel circuits which include resistors 85 and 87 may be increased so as to decrease the speed of motor 25 whenever the generator 71 is being rotated, irrespective of the direction of rotation of generator 71 (which will reverse with the reversal of direction of the positioning of heavy body 11). The effect then, as has been explained generally, is to increase the tendency to slow down motor 25 proportionately with the speed of positioning of heavy body 11. Thus, the matter of over-travel of turntable 19, and consequently hunting effects, will be avoided.

Figs. 5 and 6 illustrate two further embodiments of motor control circuits for the servo system illustrated by Fig. 3. Each of these embodiments includes the same generator 71 which is connected in a degenerative manner by the same network circuit as that illustrated in Fig. 4, i.e. resistors 85, 87, 89 and rectifiers 81 and 83. Therefore, no detailed review of these elements (of the network) will be made in regard to Figs. 5 and 6, it being sufficient to point out that in the circuit of Fig. 5, the network (of tachometer generator 71) is not in series with motor 25 but is in a control circuit which determines the duration of periods of make and break of the circuit for motor 25.

Fig. 5 illustrates a relay control make and break speed control circuit similar to that of Fig. 4 but involving a vacuum tube control for the relay instead of the commutator drum control which was illustrated in Fig. 4. This vacuum tube control involves a vaccum tube 93 which may be any convenient type but which is illustrated as a triode. The tube 93 is a hot cathode tube, but the heating circuit is not illustrated for the sake of simplicity. Motor 25 is controlled in speed by make and break contacts 95, of relay 97 which has a winding 99. The contacts 95 of relay 97 are normally closed by means of a spring bias (not shown) and so maintain the closed position as illustrated except when the relay winding 99 is energized. Motor 25 has two fields 27 and 29 which are alternatively connected to a positive supply by means of switches 31 and 33 respectively as was the case in the previous motor control circuits described. In this case (the circuit of Fig. 5) there is an appropriate mechanism 100 (indicated by a dashed line) which is similar to the mechanism represented by dashed line 35 of Figs. 2 and 4. This mechanism may take any desired form, but it is joined to a second pair of switches 101 similar to switches 31 and 33, and it is also joined to a slide arm 105. The action of mechanism 100 is such that when the central control arm 34 is moved one way or the other to initiate rotation of motor 25 in one direction or the other, the slide arm 105 is correspondingly moved one side or the other from the mid tap position illustrated, in which the slide arm 105 lies directly over a mid tap 106 of a potentiometer type resistor 107. As will be explained in more detail below, the movement of slide arm 105 from its position over the center tap 106 acts to reduce the duration of the periods when the contacts 95 are opened and therefore increases the speed of the motor 25.

Make and break contacts 95 are spring biased to the closed position illustrated and when tracking control is introduced by means of central arm 34 and mechanism 100, one or the other of the pair of switches 101 will be closed. When either of these switches is closed, the plate of vacuum tube 93 is connected directly to a positive supply wire 103, through the winding 99 of relay 97. The cathode of tube 93 is directly connected to the slide arm 105 of potentiometer type resistor 107, so that the closing of either of switches 101 completes a circuit for relay winding 99 controlled by the tube 93, which is in series with the winding 99. The grid of vacuum tube 93 is directly connected to a slide arm 109 of an auxiliary speed control potentiometer 111 whereby means are provided to balance the grid and cathode voltages so that full speed of motor 25 may be realized when potentiometer slide arm 105 is positioned at either extreme end of potentiometer 107.

When the central arm 34 of the control mechanism 100 is moved from its neutral position, one of the switches 101 will be closed as indicated above, and this will also complete a second circuit, which is in parallel with the circuit of relay winding 99 and vacuum tube 93. This second circuit includes resistors 85, 87, 113 and so much of potentiometer 107 as is determined by the degree to which arm 34 and hence slide arm 105 is moved from the neutral position. This second circuit when completed determines the potential of the cathode of vacuum tube 93 which depends upon the setting of slide arm 105, to which the cathode is directly connected.

At the same time as one of the switches 101 is being closed by the action of arm 34 and cooperating mechanism 100, either switch 31 or 33 will likewise be closed and motor 25 will be energized via normally closed contacts 95 of relay 97. At this time, when motor 25 is first energized, the grid of vacuum tube 93 will be at a very low potential, i.e. close to zero or ground potential, depending upon the relative magnitudes of resistors 115, 119, potentiometer 111, and upon the setting of slide arm 109. It will be noted that this potential on the grid of vacuum tube 93 will be very low when the armature of motor 25 is not rotating irrespective of the magnitudes of resistors 115, 119 and potentiometer 111, because, the resistance of the armature is very low and the voltage drop across whichever field winding 27 or 29 is connected into the circuit will constitute most of the applied voltage, leaving a very low potential to be bridged by the resistors 115, 119 and the potentiometer 111. As the motor begins to rotate however, the back-E.M.F. of the armature will cause the potential on the grid of tube 93 to be increased until a point is reached where sufficient current is being transmitted by the tube 93 (due to the increase in potential on the grid) to cause relay 97 to operate and open contacts 95. When this happens the grid potential of tube 93 would drop to zero if it were not for a condenser 117. At the same time current in winding 99 of relay 97 would be sharply reduced which would allow contacts 95 to be closed again, if it were not for condenser 117. However, a short period of delay is accomplished by means of condenser 117 connected to the grid of tube 93 and to one end of resistor 119 the other end of which is connected to a negative supply or common ground wire 120. The magnitudes of resistor 119 in conjunction with a portion of potentiometer 111, determine the discharge time for condenser 117. During this delay period, the potential on the grid of tube 93 will gradually be reduced as condenser 117 is discharged, until tube 93 becomes sufficiently non-conducting to release relay 97 and allow contacts 95 to close. While the contacts 95 are open the motor 25 begins to slow down. Then, when the contacts 95 reclose, the grid potential applied to tube 93 will again begin to rise, as the speed of motor 25 increases again, until relay 97 is operated again and the cycle first described is repeated; after which, the same cycle will continuously be repeated so long as arm 34 and cooperating mechanism 100 are maintained in a position to actuate motor 25.

It will be noted that the frequency of the opening and closing cycles of contacts 95 depends upon both the setting of slider 109 of potentiometer 111 and the setting of slider 105 of potentiometer 107. Potentiometer 107 may be considered the primary speed control because it determines the potential of the cathode of tube 93 relative to ground or zero potential, as well as the relative potential with respect to the grid of tube 93. It is the potential of the cathode relative to the potential of the grid which is the grid bias potential for tube 93; and this grid bias potential determines the speed motor 25 will maintain, because it determines how fast motor 25 will go before relay 97 will operate to open the make and break contacts 95 in the circuit of motor 25. The slider 109 of potentiometer 111 will ordinarily be adjusted for best operating conditions and left at this setting, while speed control of motor 25 is regulated by the position of slider 105 on center tapped potentiometer 107 as determined by arm 34 and mechanism 100.

Center tapped potentiometer 107 is connected so that it is symmetrical in its effect, i.e. whichever way the slider 105 is moved from its neutral position illustrated, the potential of the cathode of tube 93 is made more positive—the same amount for a given displacement of the slider. This is accomplished by connecting the center tap 106 to the ground or negative wire 120, while the ends of potentiometer resistor 107 are connected together and to one end of resistor 113.

The primary speed control of motor 25 which is effected by the position of slider 105 of potentiometer 107, has superimposed thereon the effect of tachometer generator 71 by means of the network in which the generator is connected. The effect of the generator network is the same as it was in Fig. 4, i.e. it introduces an increased impedance at either resistor 85 or 87 depending upon which direction the generator 71 is being driven, and the amount the impedance is increased is directly proportional to the speed of generator 71 which depends upon the speed of positioning of heavy body 11 (Fig. 3) as was explained above. In the motor control circuit of Fig. 5, however, instead of having the generator 71 with its network connected in series with motor 25, the generator and its network are in series with resistor 113 and potentiometer 107. The effect is substantially the same because the speed of motor 25 is directly effected. But, in the circuit of Fig. 5 the immediate effect is to vary the potential of the cathode of tube 93 in a similar manner as the varying of slide arm 105 of potentiometer 107 varies the potential of the cathode.

For example, take the situation wherer slider 105 is moved to apply a given potential to the cathode of tube 93. The amplitude of this potential is dependent upon the voltage drop across the network of generator 71 and across resistor 113 as well as that across potendiometer 107 itself. Therefore, the potential of the cathode of tube 93 may be varied by varying the impedance and hence the voltage drop across the network of generator 71. For this reason the speed of motor 25 is limited by the effects of generator 71 and the faster generator 71 is driven the slower motor 25 will go, because the lower the bias on tube 93, the slower the speed of motor 25 at which relay 97 will open contacts 95 each cycle.

Fig. 6 is a circuit diagram of a modified tracking-motor control circuit which also may be used in a servo system of the type illustrated in Fig. 3. In the system of Fig. 6 a make and break speed control of motor 25 is accomplished without using any mechanical contacts to effect the make and break of the motor circuit. A gas tube 121 acts as an electronic switch which varies the duration of the average period during which the motor 25 is energized.

As in the system of Fig. 5 there is the arm 34 and mechanism 100 which cooperate to close a desired one of the direction selecting switches 31 and 33, and at the same time close one of the switches 101 while also moving the slide arm 76 of a potentiometer 123 from its mid-position illustrated. In this case the potentiometer 123 had no mid-point tap, but it does have the end points 125 connected together.

The system of Fig. 6 operates in recurring cycles whenever the motor 25 is energized, and it involves a relaxation oscillator type of action. A condenser 127 is charged up whenever either of switches 101 are closed. The time constant of this charging action is determined by the position of slider arm 76 of potentiometer 123 as well as by the impedance of the network of tachometer generator 71 which includes resistors 85 and 87 which are in series with condenser 127 and potentiometer 123. As soon as the charge on condenser 127 reaches a given amplitude (depending upon the tube characteristics and the bias voltage on the grid) the tube 121 will break down and condenser 127 will discharge through tube 121, the armature of motor 24 and the selected one of the fields 27 or 29 of the motor 25. This discharge will continue until the plate voltage of tube 121 is reduced to the point where the tube will not remain ionized. The effect of deionization of tube 121 is to open this circuit and allow the condenser 127 to begin to charge up again. This operation will repeat itself so long as one of the switches 101 remains closed. The intervals between discharges of condenser 127 through motor 25 may be varied by varying the time it takes to charge condenser 127, and hence the average amount of energy supplied to the motor 25 may be varied accordingly.

It will now be clear that the position of arm 76 on potentiometer 123 will determine the time constant involved in charging condenser 127. The farther arm 76 is pivoted toward either end point 125 of the potentiometer 123 from its mid-position illustrated, the less resistance will be in series with condenser 127 and so the faster condenser 127 will charge. Consequently, motor 25 will run faster since less time delay will take place between discharges of condenser 127 through motor 25. It will also be evident that the effect of tachometer generator 71 will be to superimpose a speed control tending to slow the motor 25 down in direct proportion to the speed at which generator 71 is driven. This is similar to the effect of generator 71 in the circuits of Figs. 4 and 5 and need not be reviewed in detail here.

It will be noted that the bias on the grid of gas tube 121 will be effected by the back E.M.F. of motor 25 and the magnitudes of a resistor 129 and a condenser 131. The proper operation of the circuit will depend on the characteristics of the tube used, and, in some cases, it may be preferred to include a bias battery (not shown) in series with the resistor 129.

In both the Fig. 5 and Fig. 6 systems, there is incorporated a motor speed regulation feature, which plays an important part when the tracking motor 25 and the servo motor 13 have reached a state of continuous drive at a constant velocity. No such regulation would be necessary under theoretical conditions. But because of roughness in bearings and gearing, the load on the tracking motor 25 may vary throughout any given revolution of the gyro turntable 19. Therefore, this regulation feature is very beneficial. The feature consists of the circuits incorporating the grids of the two tubes 93 (Fig. 5) and 121 (Fig. 6). In each case, it will be noted that the grid of the tube is connected to one side of the armature of the tracking motor 25, while the cathode of the corresponding tube is connected to the other side of the armature of motor 25. In the case of the Fig. 5 circuit, this description of the connection is not strictly accurate, but the effect is the same, i.e. the grid of tube 93 is connected to some point on slide resistor 111 while resistors 115, 111 and 119 are all connected in series across the armature of motor 25. The result in either circuit (Fig. 5 or Fig. 6) is to cause any speed change of the motor 25 to be directly reflected in the control circuit by varying the bias on the grid of either tube 93 or tube 121 as the case may be. The result will be to vary the duration of the energizing pulses and hence to correct for and minimize the change in speed. Speed changes of the motor 25 are reflected because the back-E.M.F. of the motor 25 exists across its armature, and it is the back-E.M.F. which varies as the speed changes.

While I have described certain embodiments of my invention in detail in accordance with applicable statutes, I do not wish to be limited thereby as other and further modifications will suggest themselves to one skilled in the art. Consequently, this disclosure shoud be taken in a descriptive and not in any way a limiting sense.

What is claimed is:

1. In a servo control system having combined stabilization and manual control including a stable reference device, an error signal producing pick-off means controlled by said stable reference device to provide stabilization control and a motor driven element connected to said pick-off means for artificially producing an error signal to provide manual control of the system, wherein the maximum acceleration of said servo system is substantially less than the acceleration of said motor driven element, a motor for driving said element, means for controlling the speed of said motor, means for superimposing a speed reducing control onto the speed control of said motor, and means connecting said speed reducing means to said pick-off means in order to modify the speed of said motor so that the error signal will not be increased beyond a predetermined maximum.

2. In a servo control system having combined stabilization and manual control including a stable reference device, an error signal producing pick-off arm controlled by said stable reference device to provide stabilization control and a motor driven element cooperating with said pick-off arm for artificially producing an error signal to provide manual control of the system, wherein the maximum acceleration of said servo system is substantially less than the acceleration of said motor driven element, a motor for driving said element, relay controlled make and break means for controlling the speed of said motor, means for slowing down the response of said make and break means to render the make and break means less sensitive to actuation of the relay, and means mechanically connected to said pick-off arm for actuating said last named means in predetermined relation to the magnitude of the error signal.

3. In a servo control system having combined stabilization and manual control including a stable reference device, an error signal producing pick-off arm controlled by said stable reference device to provide stabilization control and a motor driven element cooperating with said pick-off arm for artificially producing an error signal to provide manual control of the system, wherein the maximum acceleration of said servo system is substantially less than the acceleration of said motor driven element, a motor for driving said element, a relay having a control winding, a pair of contacts, and a bias winding, electrical pulse producing means in circuit with said control winding, manual control means for varying the duration of said pulses from zero to a predetermined maximum, variable resistance means in circuit with said bias winding and mechanically connected to said pick-off arm for varying the response time of said pair of relay, said contacts being in circuit with said motor for controlling the speed thereof to control the amount of error being introduced in the servo system.

4. A motor control system for controlling the speed and direction of an electric motor and for superimposing a speed change sensitivity control, comprising a reversible motor, circuit means for connecting said motor to a source of power, a relay having a control winding and a bias winding, a pair of contacts actuated by said relay and connected in series with said motor to control the speed thereof by duration of contact periods, a variable duration pulse generating means for energizing said control winding to actuate said pair of contacts, and a variable impedance means for variably determining energization of said bias winding to vary the amount of lag in the response of said contacts.

5. The combination as claimed in claim 4, wherein said variable impedance means comprises a variable resistor.

6. A motor control system for controlling the speed and direction of an electric motor and for superimposing a speed change sensitivity control, comprising a reversible motor, circuit means for connecting said motor to a source of power, a relay having a control winding and a bias winding, a pair of contacts actuated by said relay and connected in series with said motor to control the speed thereof by duration of contact periods, a variable duration pulse generating means for energizing said control winding to actuate said pair of contacts, and a variable center tapped resistance means for determining energization of said bias winding in a symmetrical manner from the mid-position of said resistance means.

7. A motor control system for controlling the speed and direction of an electric motor and for superimposing a speed change sensitivity control, comprising, a reversible motor, circuit means for connecting said motor to a source of power, a relay having a control winding and a bias winding, a pair of contacts actuated by said relay and connected in series with said motor to control the speed thereof by duration of contact periods, a variable duration pulse generating means for energizing said control winding to actuate said pair of contacts, a variable resistor having a sliding contact and a center tap connection, and circuit means connecting said sliding contact and said center tap in series with said bias winding to control energization of the bias winding in a symmetrical manner from the mid-position of said sliding contact.

8. An electric motor control circuit comprising a make and break relay having contacts in series with said motor, electronic means for controlling said relay, a reactor, and circuit means including a variable impedance and said reactor for causing variable frequency actuation of said relay in order to control the speed of the motor thereby.

9. An electric motor control circuit comprising a make and break relay having contacts in series with said motor, and having a winding, electronic means in series with said winding for controlling the actuation of the relay, a condenser, variable resistance means, and circuit means including said condenser said variable resistance and said electronic means for producing a predetermined frequency of actuation of the relay and thereby controlling the speed of the motor.

10. A servo control system including a movable load device, a servomotor drivingly connected to said load device, a first control element, means connecting said first control element to said load device for concurrent movement therewith, a second control element having a normal position relative to said first control element and movable from said normal position, control means including said control elements and effective upon movement thereof from their normal relative positions to drive said servomotor in a sense to restore said first control element to its normal position, so that said load device follows the changes in position of said second control element, means for moving said second control element to control the position of said load device, manually controlled means for moving said load device relative to said second control element including means in said connecting means for changing the position of said first control element with reference to said load device, a motor for driving said position changing means, manually operable means for selecting the direction and average speed of rotation of said motor, said control means being effective in response to operation of said motor to drive said servomotor in a sense to move said first control element toward its normal position, and means responsive to a condition indicative of the speed of operation of said servomotor for reducing the average speed of the motor below said selected speed in proportion to the indicated speed of operation of the servomotor, to inhibit overshooting of said first control element past said normal position by said servomotor.

11. A servo control system as defined in claim 10, including means responsive to the speed of operation of said motor to further reduce the average speed of the motor in proportion to its own speed, to further inhibit said overshooting.

12. A servo control system as defined in claim 10, in which said means for reducing the average speed of the motor comprises an electric generator driven by said servomotor, an electrical network fed by said generator and including two parallel branches, each said branch including in series a resistor and an asymmetrically conductive element, said asymmetrically conductive elements in the two branches being oppositely poled so that one branch which carries current when the generator runs in one direction and the other branch carries current when the generator is reversed, a control circuit for said motor including said resistors in series, so that the current flow through said resistors due to the network current produces a potential drop in said control circuit in a sense tending to reduce the motor speed and proportional to the electromotive force of the generator.

13. A servo control system as defined in claim 12, in which said control circuit includes said motor and said resistors in series.

14. A servo control system as defined in claim 12, including a relay, a contact operated by said relay and controlling said motor, and an energizing circuit for said relay including said resistors.

15. A servo control system as defined in claim 10, in which said means for reducing the average speed of the motor is responsive to the displacement of said second control element from its normal position.

16. A servo control system as defined in claim 10, in which said means for reducing the average speed of the motor comprises a generator driven by said servomotor and means responsive to the electromotive force of the generator and acting on said motor in a speed reducing direction.

17. A servo control system including a movable load device, a servomotor drivingly connected to said load device, a first control element, means connecting said first control element to said load device for concurrent movement therewith, a second control element having a normal position relative to said first control element and movable from said normal position, control means including said control elements and effective upon movement thereof from their normal relative positions to drive said servomotor in a sense to restore said first control element to its normal position, so that said load device follows the changes in position of said second control element, means for moving said second control element to control the position of said load device, manually controlled means for moving said load device relative to said second control element, including means in said connecting means for changing the position of said first control element with reference to said load device, a motor for driving said position changing means, an energizing circuit for said motor, including reversing switch means for selecting the direction of rotation thereof, said motor and a thyratron in series with said motor, means responsive to the potential drop across said motor and controlling the potential on the grid of said thyratron, a capacitor connected across said motor and said thyratron in series, power supply means, and means for connecting said power supply means across said capacitor in parallel with said motor and thyratron in series, said capacitor, said thyratron and said motor comprising a relaxation oscillator circuit effective to energize said motor intermittently at a frequency determined by the speed of operation of the motor.

18. A servo control system as defined in claim 17, in which said means for connecting the power supply means comprises two resistors in series, a generator driven by said servomotor, a network fed by said generator and including two parallel branches each comprising one of said resistors and an asymmetrically conductive element, said asymmetrically conductive elements being oppositely poled in said two branches, said network and resistors cooperating to introduce into the motor circuit a potential varying with the servo motor speed and acting in a direction to reduce the motor speed.

References Cited in the file of this patent

UNITED STATES PATENTS

| | | |
|---|---|---|
| 2,462,456 | Bedford | Feb. 22, 1949 |
| 2,473,423 | Gorton | June 14, 1949 |
| 2,581,149 | Shaw | Jan. 1, 1952 |
| 2,582,222 | Belsey | Jan. 15, 1952 |
| 2,647,233 | Kutzler | July 28, 1953 |
| 2,659,850 | Phillips | Nov. 17, 1953 |
| 2,715,776 | Knowles | Aug. 23, 1955 |
| 2,724,113 | Lentz | Nov. 15, 1955 |

FOREIGN PATENTS

| | | |
|---|---|---|
| 793,301 | France | Nov. 16, 1935 |